(12) United States Patent
Lowe

(10) Patent No.: US 10,994,646 B2
(45) Date of Patent: May 4, 2021

(54) TRAILER ASSEMBLY AND METHOD OF USE FOR SELECTABLY BOTTOM DUMPING AND REAR DUMPING PARTICULATE MATERIAL

(71) Applicant: Equipfix, Stayner (CA)

(72) Inventor: James Edwin Lowe, Stayner (CA)

( * ) Notice: Subject to any disclaimer, the term of this patent is extended or adjusted under 35 U.S.C. 154(b) by 0 days.

(21) Appl. No.: 16/946,276

(22) Filed: Jun. 13, 2020

(65) Prior Publication Data

US 2020/0391646 A1    Dec. 17, 2020

Related U.S. Application Data

(60) Provisional application No. 62/861,271, filed on Jun. 13, 2019.

(51) Int. Cl.
*B60P 1/38* (2006.01)
*B60P 1/56* (2006.01)

(52) U.S. Cl.
CPC .. *B60P 1/38* (2013.01); *B60P 1/56* (2013.01)

(58) Field of Classification Search
CPC ...... B60P 1/36; B60P 1/38; B60P 1/56; B65G 2812/012; B65G 2812/013; B65G 2812/016; B65G 2812/018
USPC ........................................ 414/519, 528, 813
See application file for complete search history.

(56) References Cited

U.S. PATENT DOCUMENTS

| | | | | |
|---|---|---|---|---|
| 3,888,366 A * | 6/1975 | Prahst | ...................... | B60P 1/38 414/527 |
| 3,913,760 A * | 10/1975 | Koral | ........................ | B60P 1/38 414/528 |
| 3,937,338 A * | 2/1976 | Cox | .......................... | B60P 1/38 414/528 |
| 4,345,869 A * | 8/1982 | King | ......................... | B60P 1/38 414/520 |
| 4,387,798 A * | 6/1983 | Jamison | ................. | B65G 15/24 198/303 |
| 4,453,875 A * | 6/1984 | Johnson, Sr. | ............. | B60P 1/38 105/355 |
| 4,790,715 A * | 12/1988 | Alexander | ................ | B60P 1/36 414/489 |
| 5,902,090 A * | 5/1999 | Young | ....................... | B60P 1/38 414/527 |
| 5,934,862 A * | 8/1999 | Brown | ...................... | B60P 1/38 414/528 |
| 6,623,234 B1 * | 9/2003 | Herring | ................... | B60P 1/286 296/183.1 |
| 6,698,997 B2 * | 3/2004 | Arne | ........................ | B60P 1/28 239/672 |

(Continued)

*Primary Examiner* — Joseph A Dillon, Jr.
(74) *Attorney, Agent, or Firm* — Stuart L. Wilkinson

(57) ABSTRACT

A trailer assembly has a frame, wheels attached to and bearing the frame and a hopper mounted on the frame. A front conveyor belt is mounted in a front part of the hopper and is operable to rearwardly convey contents of the hopper overlying the belt. A rear conveyor belt is mounted in a rear part of the hopper and is operable in a first mode to rearwardly convey contents of the hopper overlying the rear belt and is operable in a second mode to forwardly convey contents of the hopper overlying the second conveyor belt. Depending on the direction of conveyance of the rear conveyor belt, the two conveyor belts can be operated either to convey contents for dumping through a rear gate or to convey contents for dumping through a bottom gate.

12 Claims, 3 Drawing Sheets

(56) References Cited

U.S. PATENT DOCUMENTS

| | | | | |
|---|---|---|---|---|
| 8,067,704 | B2* | 11/2011 | Lowe | G01G 11/12 |
| | | | | 177/16 |
| 2002/0076312 | A1* | 6/2002 | Schatzler | B60R 5/04 |
| | | | | 414/462 |
| 2006/0120844 | A1* | 6/2006 | Rivers | B60P 1/38 |
| | | | | 414/528 |
| 2006/0201777 | A1* | 9/2006 | Michel | B60P 1/38 |
| | | | | 198/311 |
| 2008/0038101 | A1* | 2/2008 | Klatt | B60P 1/38 |
| | | | | 414/345 |
| 2009/0050449 | A1* | 2/2009 | Boele | B65G 17/48 |
| | | | | 198/735.2 |
| 2009/0053026 | A1* | 2/2009 | Pierce | B60P 1/36 |
| | | | | 414/503 |
| 2013/0230373 | A1* | 9/2013 | Pippin | B65G 67/08 |
| | | | | 414/395 |
| 2013/0343848 | A1* | 12/2013 | Wangen | B60P 1/38 |
| | | | | 414/528 |
| 2017/0144579 | A1* | 5/2017 | Wikel | B60P 1/38 |
| 2018/0014465 | A1* | 1/2018 | Scremin | B60P 1/16 |
| 2020/0180867 | A1* | 6/2020 | Chung | B65G 15/62 |
| 2020/0331713 | A1* | 10/2020 | Woltermann | B65G 65/32 |
| 2020/0363346 | A1* | 11/2020 | Dep | B65G 15/08 |

* cited by examiner

TRAILER ASSEMBLY AND METHOD OF USE FOR SELECTABLY BOTTOM DUMPING AND REAR DUMPING PARTICULATE MATERIAL

BACKGROUND

This invention relates to trailers for use in transporting and dumping particulate materials such as rubble, stone, gravel or sand. While there are many forms of trailer for transporting particulate material, two common types are rear dump trailers and bottom or belly dump trailers. A rear dump trailer is used to dump particulate materials as a pile from the rear of the truck hopper. A bottom dump trailer is used to dump particulate materials from underneath the truck hopper, the dumping action being coordinated with forward movement of the trailer so as to spread the dumped material into a layer of consistent thickness.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DESCRIPTION OF THE INVENTION INCLUDING THE PRESENTLY PREFERRED EMBODIMENTS

Figure 1:
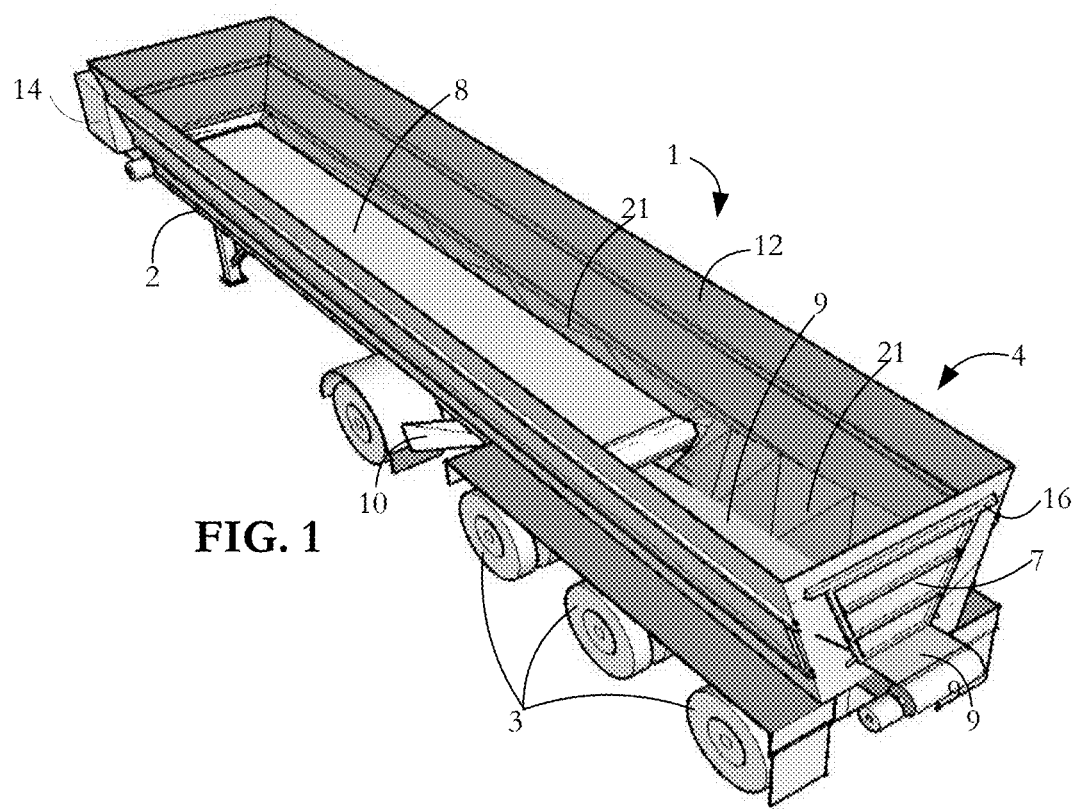
FIG. 1 is a perspective view from above, the rear and one side of a trailer assembly according to one embodiment of the invention.
Figure 2:
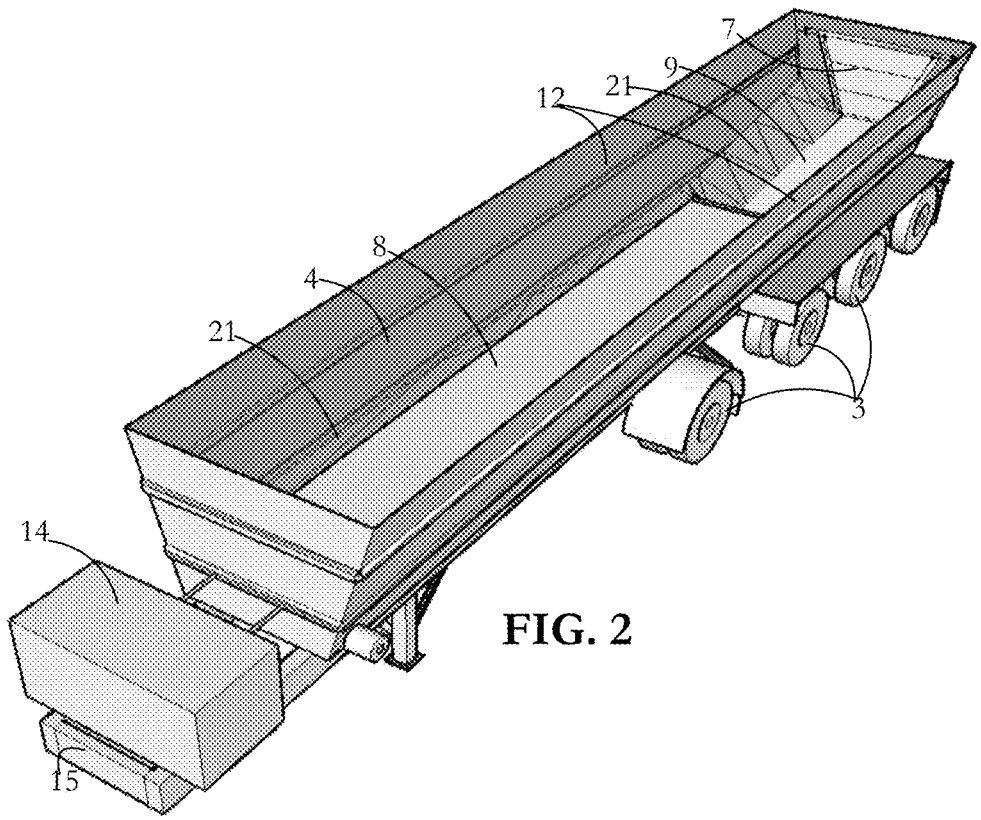
FIG. 2 is a perspective view from above, the front and the other side of the trailer assembly of FIG. 1.
Figure 3:
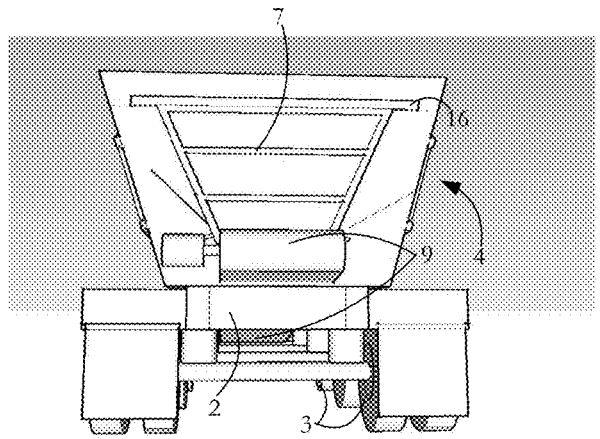
FIG. 3 is a rear view of the trailer assembly of FIG. 1.
Figure 4:
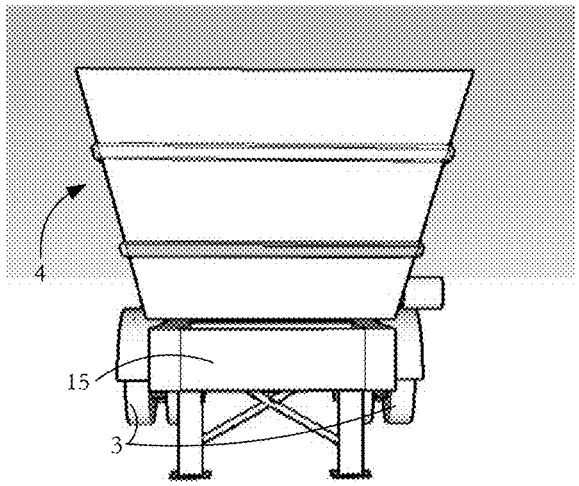
FIG. 4 is a front view of the trailer assembly of FIG. 1.

Shown in FIGS. 1 and 2 is a trailer 1 according to one embodiment of the invention that can be used either as a rear dump trailer or a bottom dump trailer. The trailer has a frame 2 mounted on wheels 3, a hopper 4 mounted on the frame 2, and an articulated connection means such as a hitch 5 for joining the trailer to suitable tractor means (not shown). The tractor and trailer units can be detached from one another at the articulated connection so that they can be worked on or used separately. The trailer hopper or bed 4 is basically a 4-walled, rectangular, box-form, open container having a truncated V cross-section as shown in FIGS. 3 and 4. The hopper 4 has reinforced side walls 12 that are anchored to the frame 2. To equip the trailer for heavy loads, the side walls are often reinforced with brackets for added strength. The lower part of the hopper 4 is located between the wheels 3 mounted on the left and right sides of the trailer 1.

The rear of the hopper 4 has a rear gate 7 which functions as a back retaining wall when the tractor-trailer is being used to transport particulate materials to a dumping destination. At the dump location, the rear gate 7 can be moved from a closed to an open position for releasing particulate material from the back of the hopper 4. In one form, the top of the gate has a hinge 16 which is connected to the tops of the hopper sides 12 to allow it to be swung open when locking means along a bottom edge of the rear gate are released. Once unlocked, the rear gate is moved using a double acting piston and cylinder arrangement driven from a hydraulic system tailored for use by trailer sub-systems and mounted at the front of the trailer. Alternatively, the trailer subsystems can be connected to and run by the tractor unit hydraulic system. In a further alternative, drive to the rear gate is a pneumatic or manual drive. The rear gate may be fully opened with the tractor trailer parked at a dumping destination so as to dump the contents of the hopper in a pile. The tractor trailer may alternatively be driven forwardly during the rear dumping process so that the material contents of the hopper, as they fall through the rear gate, are spread out in the direction of travel. The rear gate can be opened to an intermediate position in concert with forward travel to meter the spread of material in the travel direction. In an alternative form, the rear gate may alternatively or additionally be hinged along its bottom edge.

The hopper 4 has a bottom closeable opening intermediate the front and the back of the hopper for releasing particulate material from the bottom of the hopper 4. A bottom gate 6 is mounted to the hopper sides or frame and can be moved between a position in which the opening is blocked and a position in which it is unblocked. In one embodiment, the gate is a plate which slides along spaced channels integral with the frame. The plate can have a flat or curved cross-section section, the spaced channels being correspondingly shaped to permit sliding. In the closed position, the aperture is blocked by the plate, and in the open position, particulate contents from the hopper drop through the gate. The gate 6 can be opened fully or partially depending on the nature of the particulate material being dropped and on the rate at which it is to be dropped. As the material contents drop through the bottom gate, the tractor unit is forwardly driven so that the falling contents are distributed in the direction of travel. The deposition thickness layer can be varied by varying either or both of the speed of the tractor-trailer unit and the size of the bottom gate aperture. In one embodiment, the bottom gate is moved using a double acting piston and cylinder arrangement driven by the tractor unit hydraulic drive. As previously noted, a hydraulic system tailored for use by trailer sub-systems can be mounted on the trailer itself or hydraulic drive can be accessed from the tractor unit. In a further alternative, drive to the bottom gate is a pneumatic or manual drive. The bottom gate can alternatively be implemented as a hinged or clamshell gate.

The trailer shown in FIGS. 1 and 2 is a live bottom trailer having two flexible conveyor belts 8 and 9 mounted in the base of the hopper and forming the hopper floor. The conveyor belts 8 and 9 are each manufactured as continuous belts extending around spaced rollers 11, one of which is a drive roller. The drive roller is driven from either the tractor unit's on-board hydraulic system or a dedicated hydraulic system 14 mounted on a platform part 15 of the frame 2 located in front of the hopper 4. Each conveyor belt may also be supported by intermediate idler rollers 19. The rollers are attached to drive shafts which are mounted in bearings at spaced housings. The housings are mounted to the frame at locations outside the hopper interior. Typically, the belts each have a top layer, a carcass and a bottom layer. The carcass provides strength and shape retention, exemplary materials being woven steel or polyester. Suitable cover materials are natural and synthetic rubber. The overall thickness, strength and resistance to wear of the belt material are selected in dependence on the nature and weight of the loads to be transported and conveyed. In an alternative embodiment, both of the spaced rollers are drive rollers with a endless chain drive synchronously driving the rollers through drive sprockets mounted on drive shafts.

Figure 6:
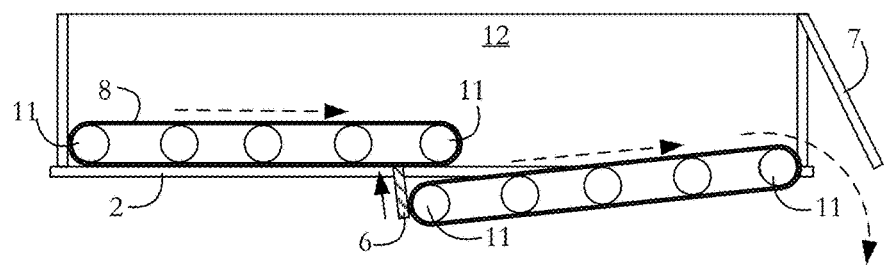
FIG. 6 is a sectional view of a trailer hopper according to an aspect of the invention showing a relationship between rear and front conveyor belts suitable for rear dumping.
Figure 7:
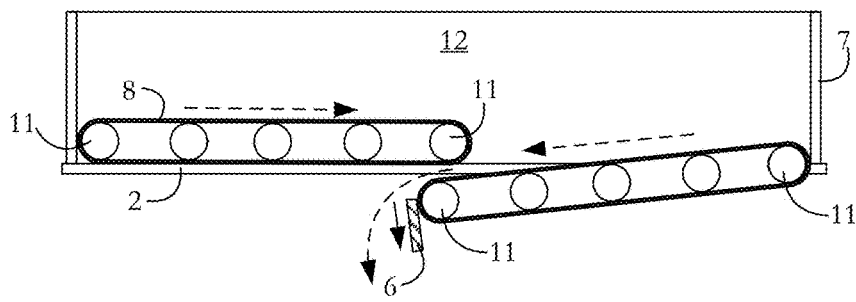
FIG. 7 is a sectional view of a trailer hopper according to an aspect of the invention showing a relationship between rear and front conveyor belts suitable for bottom dumping.

As shown in FIGS. 6 and 7, a front part 17 of the rear conveyor 9 is situated below a rear part 18 of the front conveyor 8. The rear conveyor belt 9 slopes upwardly towards the back of the trailer assembly 1 and the front conveyor belt 8 is generally horizontal. The gate 6 can be slid from its closed position (FIG. 6) to its open position (FIG. 7) to open up the space between the conveyor parts 17 and 18 and so permit bottom dumping. In one embodiment, the height of either or both of the conveyor belts 8 and 9 can be adjusted about one of the axes of rollers 11 to increase or decrease the vertical spacing between the adjacent conveyor end parts 17 and 18.

Figure 8:
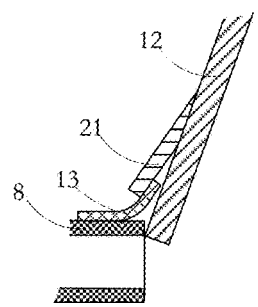
FIG. 8 is a scrap sectional view of a conveyor belt protection feature.
Figure 5:
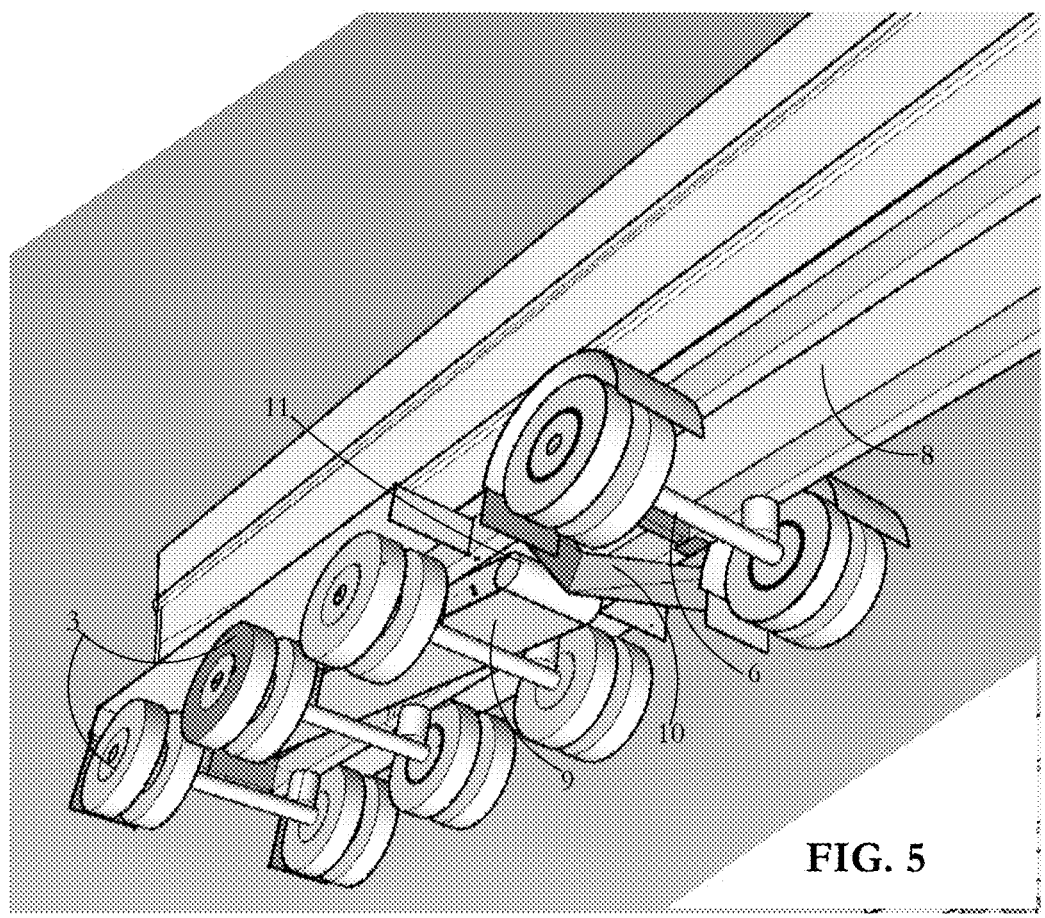
FIG. 5 is a perspective view from below, from the rear and from the one side of a part of the trailer assembly of FIG. 1.

As shown in the scrap sectional view of FIG. 8, the conveyor belts 8 and 9 are mounted so that their side edges 20 are close to the inclined walls 12 of the hopper 4. The side edges 20 are covered by a periodically replaceable, heavy duty, flexible covering or flashing 13 which is mounted under elongate flanges 21 extending along and welded to the inner surfaces of the hopper side walls 12. The lengths of flashing 13 extend along the full length of each the belts 8, 9 so as to inhibit particulate material from falling through and damaging the sides of the belts as they pass along the hopper walls 12.

In a preferred embodiment, the tractor trailer has an electronic control system for the trailer hydraulics with control access both in the tractor unit cab and at a back or other location on the trailer. The main control elements involve (a) coordinated opening and closing of the rear gate and the associated rear drive applied to both conveyor belts, and (b) coordinated opening and closing of the bottom gate, an associated rear drive applied to the front conveyor belt and a forward drive applied to the rear conveyor belt.

Particularly for use in depositing particulate materials on roads, a V-form spreader 10 for distributing falling material is mounted to the frame. The spreader is positioned so that its V points rearwardly relative to the tractor trailer direction of travel and is immediately in front of the front roller 11 of the rear conveyor. Other known forms of spreader mechanism, such as a spinner, can be mounted under the bottom opening for distributing falling material.

In a rear dumping operation, the bottom gate 6 is closed and the rear gate 7 is unlocked and driven to an open condition. The front conveyor belt 8 is then operated to rearwardly move particulate material overlying the front conveyor. At the same time, the rear conveyor belt 9 is operated to rearwardly move particulate material overlying the rear conveyor belt for dumping through the rear opening 7, the dumped particulate material consisting partly of material that had overlain the rear conveyor belt 9 and material that had overlain the front conveyor belt 8 before dropping onto the rear conveyor belt 9 after being rearwardly conveyed by the front conveyor belt 8.

In a bottom dumping operation, the bottom gate 6 is open and the rear gate 7 is closed. The front conveyor belt 8 is operated to rearwardly move particulate material overlying the front conveyor belt 8 for release through bottom gate 6 and the rear conveyor belt 9 is operated to forwardly move particulate material overlying the rear conveyor belt 9 for release through the gate 6. In the illustrated embodiment, particulate material from the moving front conveyor belt drops onto the forwardly moving rear conveyor prior to discharge through the gate 6. As the rear conveyor belt 9 is conveying forwardly, particulate material driven off the front end of the rear conveyor is thrown against the V spreader 10 to deflect and distribute it to left and right so as to avoid a windrow type material deposit and to obtain instead a layer of material spread more evenly across a road or other deposit region.

In this specification, particulate material means material such as rubble, stone, gravel, sand, or similar material in terms of particle size.

Other variations and modifications will be apparent to those skilled in the art and the embodiments of the invention described and illustrated are not intended to be limiting. The principles of the invention contemplate alternatives having advantages and properties evident in the exemplary embodiments.

The invention claimed is:

1. A trailer assembly for dumping, comprising a frame, wheels attached to and bearing the frame, a hopper mounted on the frame, a first conveyor belt mounted in a front part of the hopper and a second conveyor belt mounted in a rear part of the hopper, the first conveyor belt operable to rearwardly convey contents of the hopper overlying the first conveyor belt to an end of the first conveyor where the conveyed contents drop onto the second conveyor belt, the second conveyor belt selectively operable in a first mode to rearwardly convey the dropped contents for rear dumping thereof, belt and selectively operable in a second mode to forwardly convey the dropped contents for bottom dumping thereof.

2. The trailer assembly as claimed in claim 1, further comprising a bottom gate located in the bottom of the hopper, the bottom gate adjustable from a closed position in which contents of the hopper are prevented by the bottom gate from bottom dumping to an open position to permit bottom dumping of contents from a central part of the hopper.

3. The trailer assembly as claimed in claim 2, wherein the bottom gate has a slide mounting to the frame to allow sliding of the bottom gate between its closed and open positions.

4. The trailer assembly as claimed in claim 1, further comprising a rear gate at the rear of the hopper, the rear gate adjustable from a closed position in which contents of the hopper are prevented by the rear gate from rear dumping to an open position to permit rear dumping of contents from the rear of the hopper.

5. The trailer assembly as claimed in claim 4, wherein the rear gate has a hinge mounting to side walls of the hopper to allow swinging of the rear gate between its closed and open positions.

6. The trailer assembly as claimed in claim 1, wherein the front conveyor belt has a rear end part, the rear conveyor belt has a front end part, and the front conveyor belt rear end part is located in spaced relationship over the rear conveyor belt front end part.

7. The trailer assembly as claimed in claim 6, wherein in the bottom gate closed position, the bottom gate blocks the space between the rear end part of the front conveyor belt and the front end part of the rear conveyor belt.

8. The trailer assembly as claimed in claim 6, wherein the rear conveyor belt slopes upwardly towards the rear of the hopper.

9. The trailer assembly as claimed in claim 8, wherein the front conveyor belt is substantially horizontal.

10. The trailer assembly as claimed in claim 1, wherein the conveyor belts are continuous belts and each conveyor belt extends around a respective pair of spaced rollers having parallel axes of rotation, the spaced rollers of each pair including at least one drive roller.

11. The trailer assembly as claimed in claim 1, further comprising protective flashing strips extending along and covering junctions between side edges of the conveyor belts and inner side surfaces of the hopper.

12. A method of operating a trailer assembly having a frame, wheels attached to and bearing the frame, a hopper mounted on the frame, a first conveyor belt mounted in a front part of the hopper and a second conveyor belt mounted in a rear part of the hopper, the method comprising operating the first conveyor belt to rearwardly convey contents of the hopper overlying the first conveyor belt to a rear end of the first conveyor belt where the conveyed contents drop onto the second conveyor belt, and selectively operating the second conveyor belt in a first mode to rearwardly convey the dropped contents for rear dumping thereof and selectively operating the second conveyor belt in a second mode to forwardly convey the dropped contents for bottom dumping thereof.

* * * * *

UNITED STATES PATENT AND TRADEMARK OFFICE
CERTIFICATE OF CORRECTION

Page 1 of 1

PATENT NO. : 10,994,646 B2
APPLICATION NO. : 16/946276
DATED : May 4, 2021
INVENTOR(S) : James E. Lowe It is certified that error appears in the above-identified patent and that said Letters Patent is hereby corrected as shown below:

In the Claims

Claim 1 should read:
1. A trailer assembly for dumping, comprising a frame, wheels attached to and bearing the frame, a hopper mounted on the frame, a first conveyor belt mounted in a front part of the hopper and a second conveyor belt mounted in a rear part of the hopper, the first conveyor belt operable to rearwardly convey contents of the hopper overlying the first conveyor belt to an end of the first conveyor where the conveyed contents drop onto the second conveyor belt, the second conveyor belt selectively operable in a first mode to rearwardly convey the dropped contents for rear dumping thereof, and selectively operable in a second mode to forwardly convey the dropped contents for bottom dumping thereof.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*